G. W. BARNARD.
MANURE SPREADER.
APPLICATION FILED MAR. 25, 1910.
993,640.
Patented May 30, 1911.
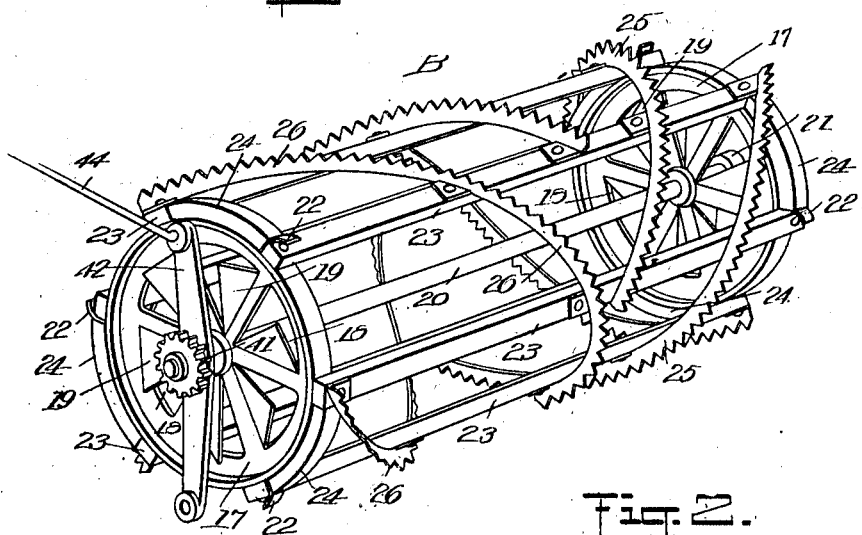
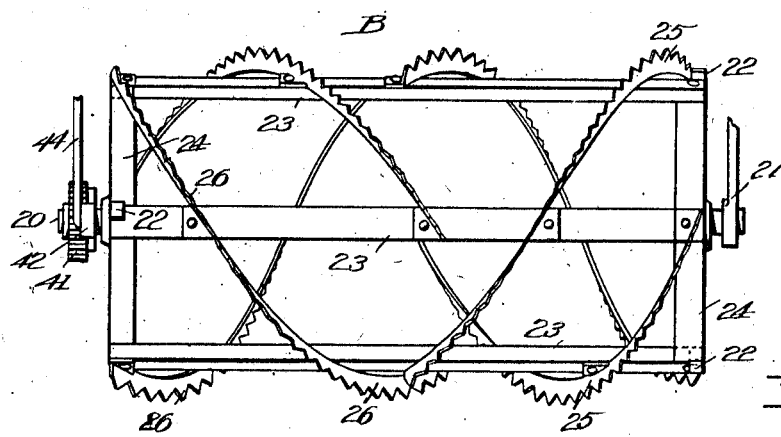
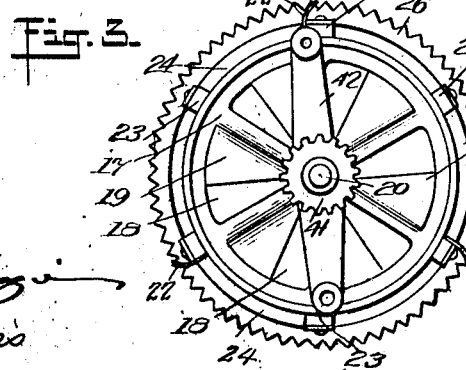
WITNESSES
INVENTOR
GEORGE W. BARNARD
BY
ATTORNEYS

UNITED STATES PATENT OFFICE.

GEORGE W. BARNARD, OF ECONOMY, INDIANA.

MANURE-SPREADER.

993,640.  Specification of Letters Patent.  Patented May 30, 1911.

Application filed March 25, 1910. Serial No. 551,529.

*To all whom it may concern:*

Be it known that I, GEORGE W. BARNARD, a citizen of the United States, and a resident of Economy, in the county of Wayne and State of Indiana, have invented a new and Improved Manure-Spreader, of which the following is a full, clear, and exact description.

The invention relates to manure spreaders of that class in which the material is distributed from a wagon by means of a distributing cylinder or beater.

The purpose of the invention is to provide a distributing cylinder or beater for spreading manure or a fertilizer of any description, and which will be simple in construction and reliable in operation, the distributing cylinder being so constructed that it will not only separate and practically pulverize the manure, but will also scatter the same broadcast over a greater area than that occupied by the machine.

In the accompanying drawings forming a part of this specification, Figure 1 is a perspective view of the distributing cylinder or beater; Fig. 2 is a plan view of the same; Fig. 3 is an end view of the cylinder; and Fig. 4 is a view on a reduced scale, showing the cylinder or beater in position at the rear end of the body of a vehicle.

Like characters of reference indicate corresponding parts in all the views.

The cylinder or beater B is mounted to revolve at the open rear end of the body A of a wagon and is adapted to pulverize or otherwise reduce and to distribute the manure or fertilizer fed thereto. This cylinder or beater B is constructed with opposing heads 17 having radial openings 18 therein, that facilitate the escape of material at the ends of the cylinder and render the heads light, and at corresponding side edges of the said openings 18, outwardly-flared flanges 19 are produced that serve to facilitate the spreading of the manure. The cylinder is provided with a shaft 20 to which the heads are secured and that extends beyond said heads. The right-hand end of the shaft 20 is mounted in a pivoted bearing 21, see Figs. 1 and 2, and the left-hand end is mounted adjustably in bearings to be hereinafter described and as shown in Figs. 1 and 4. Bars 23 extend from one head 17 of the cylinder B to the other, as is shown best in Fig. 2, being suitably secured to the peripheral portions of said heads. By preference the heads also carry segmental braces 24 for the bars 23. It is not necessary that these braces extend between all of the bars 23, but when employed, they have curved spurs 22 wherever they can be advantageously employed, that facilitate the work of pulverization and distribution, since the cylinder or beater B as a whole is located between the sides of the body A.

The principal work of pulverizing and distributing the manure is performed by two series of saw-tooth blades, spirally arranged in opposite directions around the exterior of the cylinder B between its heads. One series of said blades is designated as 25, the right-hand series, while the other or left-hand series, is designated as 26. These blades 25 and 26 extend from points at each side of the center of the cylinder B to its heads of the other ends of the bars 23, as is best shown in Fig. 2. In the arrangement of the series of saw-tooth blades 25 and 26, the blades of one series at their inner ends terminate opposite, yet removed from, approximately the central portion of the next series. This construction of cylinder or beater not only pulverizes the manure, but scatters it to such an extent that the manure is delivered in a swath much wider than the length of the cylinder and the width of the body of the wagon on which the cylinder is mounted.

The cylinder or heater B is driven from a gear 37 at the left-hand end portion of the rear axle 10 of the wagon, and a chain connection 38 between said gear and a pinion 39 on a short shaft $40^a$ secured to a bracket $40^b$, as is shown in Fig. 4, and the pinion 39 is attached to a larger gear 40, adapted for driving engagement with a pinion 41, carried by a lever arm 42, also shown in Figs. 1 and 4, which lever arm is fulcrumed at its lower end to said bracket $40^b$, as is shown in dotted lines at 43 in Fig. 4. The upper end of the said lever arm 42 has pivotal engagement with a connecting rod 44 under the control of the operator.

The pinion 41, in addition to being carried by the arm 42, is fast upon the shaft 20 of the cylinder, and said arm constitutes the bearing for the left hand end of the cylinder shaft. Thus as the cylinder shaft is mounted in swing bearings, by actuating the connecting rod 44, the cylinder is moved bodily to carry the pinion 41 out of mesh with the gear 40 to stop the rotation of the cylinder.

Suitable pivotally-mounted spring-controlled combs 78 are provided to keep the teeth of the blades 25 and 26 clean.

Having thus described my invention, I claim as new and desire to secure by Letters Patent:

1. In a manure or fertilizer spreader, a distributing cylinder or beater, comprising a skeleton frame, and series of oppositely-disposed spirally arranged saw tooth blades that throw the material beyond the ends of the cylinder.

2. In a manure or fertilizer spreader, a distributing cylinder or beater, comprising a skeleton frame, and series of oppositely-disposed saw tooth blades spirally arranged upon the cylinder that serve to throw the material beyond the ends of the cylinder and pulverize the material fed thereto.

3. In a manure or fertilizer spreader, a distributing cylinder or beater, comprising apertured heads having openings therein and outwardly flared flanges at corresponding walls of said openings, and opposing series of saw-tooth blades spirally secured upon the periphery of the cylinder, and means for optionally rotating the cylinder.

4. In a manure or fertilizer spreader, a cylinder or beater, and means for optionally operating the same, which cylinder consists of opposing heads having openings and flanges at the corresponding walls of the openings, and opposing spirally-arranged saw-tooth blades, that extend from points at the ends of the cylinder to points near its center, the terminals of the blades of one series stopping short of a point intermediate the ends of the other series of blades.

5. In a manure or fertilizer spreader, a cylinder or beater, and means for optionally operating the same, which cylinder consists of opposing heads, having openings and flanges at the corresponding walls of the openings, and opposing spirally-arranged saw-tooth blades, that extend from points at the ends of the cylinder to points near its center, the terminal of the blades of one series stopping short of a point intermediate the ends of the other series of blades, and spurs carried by the heads of the cylinder, pointing in the direction of its rotation, assisting in the spreading of the material.

6. In a manure or fertilizer distributer, a skeleton cylinder or beater, and opposing spirally-arranged series of saw-tooth blades secured to the periphery thereof, the blades of one series at their inner ends terminating opposite approximately the central portion of the blades of the other series.

7. In a manure or fertilizer spreader, a cylinder or beater comprising heads having openings therein, a shaft to which the heads are secured, bars extending from one head to the other and secured to the periphery of said heads, series of oppositely disposed saw-tooth blades spirally secured upon the said bars, and means for rotating the cylinder.

8. In a manure or fertilizer spreader, a cylinder or beater comprising heads having radial openings therein and outwardly flared flanges at corresponding side edges of said openings, a shaft to which the heads are secured, spaced bars extending from one head to the other and secured to the periphery of the heads, series of oppositely disposed spiral blades secured to said bars, and means for rotating the cylinder.

In testimony whereof I have signed my name to this specification in the presence of two subscribing witnesses.

GEORGE W. BARNARD.

Witnesses:
ELMER BALL,
JAS. W. JACKSON.